US011247421B1

(12) United States Patent
Gulgunje et al.

(10) Patent No.: US 11,247,421 B1
(45) Date of Patent: Feb. 15, 2022

(54) SINGLE-STEP EXTRUSION OF FIBER OPTIC PLATES FOR ELECTRONIC DEVICES

(71) Applicant: Apple Inc., Cupertino, CA (US)

(72) Inventors: Prabhakar Gulgunje, Cupertino, CA (US); Wei Lin, Santa Clara, CA (US); Shubhaditya Majumdar, Santa Clara, CA (US); Nathan K. Gupta, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/848,264

(22) Filed: Apr. 14, 2020

Related U.S. Application Data

(60) Provisional application No. 62/889,353, filed on Aug. 20, 2019.

(51) Int. Cl.
*G02B 6/08* (2006.01)
*B29D 11/00* (2006.01)

(52) U.S. Cl.
CPC .......... *B29D 11/00663* (2013.01); *G02B 6/08* (2013.01); *B29K 2995/0026* (2013.01)

(58) Field of Classification Search
CPC ....................................................... G02B 6/08
See application file for complete search history.

(56) References Cited

U.S. PATENT DOCUMENTS

| 28,341 A | 5/1860 | Bennett |
| 4,349,817 A | 9/1982 | Hoffman et al. |
| 4,534,813 A | 8/1985 | Williamson et al. |
| 5,329,386 A | 7/1994 | Birecki et al. |
| 5,502,457 A | 3/1996 | Sakai et al. |
| 5,659,378 A | 8/1997 | Gessel |
| 6,046,730 A | 4/2000 | Bowen et al. |
| 6,407,785 B1 | 6/2002 | Yamazaki |
| 6,467,922 B1 | 10/2002 | Blanc et al. |
| 6,680,761 B1 | 1/2004 | Greene et al. |

(Continued)

FOREIGN PATENT DOCUMENTS

KR 20180034832 A 4/2018

OTHER PUBLICATIONS

Mignanelli et al., 'Polymer Microstructured Fibers by One-Step Extrusion', Optics Express, vol. 15, Issue 10, pp. 6183-1689, May 14, 2007, https://doi.org/10.1364/OE.15.006183.

*Primary Examiner* — Rhonda S Peace
(74) *Attorney, Agent, or Firm* — Treyz Law Group, P.C.; Joseph F. Guihan

(57) ABSTRACT

An electronic device may have a housing with a display. A protective display cover layer for the display may have an image transport layer such as a fiber optic plate. The fiber optic plate may be formed from fibers. An extruder may form fiber bundles that each include a respective plurality of fibers distributed in binder material. The fiber bundles from the extruder may be fed directly to a block forming die. The block forming die may receive the fiber bundles from the extruder and output a unitary fiber block. The fiber bundles may remain heated in the block forming die such that the binder material of the fiber bundles seamlessly merges during formation of the unitary fiber block. A cutter can be used to cut off a layer of the unitary fiber block. This layer may be machined and polished to form the fiber optic plate.

15 Claims, 8 Drawing Sheets

(56) References Cited

U.S. PATENT DOCUMENTS

| | | | |
|---|---|---|---|
| 6,845,190 B1 | 1/2005 | Smithwick et al. | |
| 6,892,011 B2 | 5/2005 | Walker et al. | |
| 6,928,218 B2 | 8/2005 | Nakata et al. | |
| 7,221,835 B1 | 5/2007 | Weisser et al. | |
| 7,228,051 B2 | 6/2007 | Cok et al. | |
| 7,542,209 B2 | 6/2009 | McGuire, Jr. | |
| 7,773,849 B2 * | 8/2010 | Shani | G02B 6/0046 385/131 |
| 7,823,309 B2 | 11/2010 | Albenda | |
| 7,856,161 B2 * | 12/2010 | Tabor | G02B 6/08 385/120 |
| 8,045,270 B2 | 10/2011 | Shin et al. | |
| 8,723,824 B2 | 5/2014 | Myers et al. | |
| 8,824,779 B1 | 9/2014 | Smyth | |
| 8,976,324 B2 | 3/2015 | Yang et al. | |
| 8,977,090 B2 * | 3/2015 | Lambert | G02B 6/08 385/116 |
| 9,182,542 B2 * | 11/2015 | Wu | G02F 1/133524 |
| 9,268,068 B2 | 2/2016 | Lee | |
| 9,274,369 B1 * | 3/2016 | Lee | G02F 1/133524 |
| 9,312,517 B2 | 4/2016 | Drzaic et al. | |
| 9,342,105 B2 | 5/2016 | Choi et al. | |
| 9,435,939 B2 * | 9/2016 | Yang | G02B 6/08 |
| 9,509,939 B2 | 11/2016 | Henion et al. | |
| 9,591,765 B2 | 3/2017 | Kim et al. | |
| 9,755,004 B2 | 9/2017 | Shieh et al. | |
| 9,818,725 B2 | 11/2017 | Bower et al. | |
| 9,907,193 B2 | 2/2018 | Lee et al. | |
| 10,048,532 B2 | 8/2018 | Powell et al. | |
| 10,052,831 B2 | 8/2018 | Welker et al. | |
| 10,114,163 B1 * | 10/2018 | Lu | H04N 9/3147 |
| 10,436,979 B2 * | 10/2019 | Yang | G02F 1/3137 |
| 10,579,157 B1 * | 3/2020 | Wilson | G06F 3/0216 |
| 10,860,142 B1 * | 12/2020 | Northcott | G02B 6/04 |
| 2006/0016448 A1 | 1/2006 | Ho | |
| 2007/0097108 A1 | 5/2007 | Brewer | |
| 2008/0144174 A1 | 6/2008 | Lucente et al. | |
| 2008/0186252 A1 | 8/2008 | Li | |
| 2010/0177261 A1 | 7/2010 | Jin et al. | |
| 2010/0238090 A1 | 9/2010 | Pomerantz et al. | |
| 2011/0025594 A1 | 2/2011 | Watanabe | |
| 2011/0057861 A1 | 3/2011 | Cok et al. | |
| 2011/0102300 A1 | 5/2011 | Wood et al. | |
| 2011/0242686 A1 | 10/2011 | Wantanbe | |
| 2012/0218219 A1 | 8/2012 | Rappoport et al. | |
| 2013/0081756 A1 | 4/2013 | Franklin et al. | |
| 2013/0083080 A1 | 4/2013 | Rappoport et al. | |
| 2013/0235560 A1 | 9/2013 | Etienne et al. | |
| 2013/0279088 A1 | 10/2013 | Raff et al. | |
| 2014/0037257 A1 * | 2/2014 | Yang | G02B 6/08 385/116 |
| 2014/0092028 A1 | 4/2014 | Prest et al. | |
| 2014/0092346 A1 | 4/2014 | Yang et al. | |
| 2014/0147087 A1 * | 5/2014 | Lambert | G02B 6/08 385/116 |
| 2014/0183473 A1 | 7/2014 | Lee et al. | |
| 2014/0240985 A1 | 8/2014 | Kim et al. | |
| 2014/0328041 A1 | 11/2014 | Rothkopf et al. | |
| 2014/0354920 A1 | 12/2014 | Jang et al. | |
| 2015/0093087 A1 | 4/2015 | Wu | |
| 2015/0227227 A1 | 8/2015 | Myers et al. | |
| 2015/0370012 A1 * | 12/2015 | Ishihara | G02B 6/06 348/308 |
| 2016/0231784 A1 | 8/2016 | Yu et al. | |
| 2016/0234362 A1 | 8/2016 | Moon et al. | |
| 2016/0341892 A1 * | 11/2016 | Yang | G02B 6/0078 |
| 2017/0235341 A1 | 8/2017 | Huitema et al. | |
| 2018/0052312 A1 | 2/2018 | Jia et al. | |
| 2018/0088416 A1 | 3/2018 | Jiang et al. | |
| 2018/0372958 A1 | 12/2018 | Karafin et al. | |
| 2019/0391326 A1 * | 12/2019 | Yang | G02F 1/3137 |

* cited by examiner

SINGLE-STEP EXTRUSION OF FIBER OPTIC PLATES FOR ELECTRONIC DEVICES

This application claims the benefit of provisional patent application No. 62/889,353, filed Aug. 20, 2019, which is hereby incorporated by reference herein in its entirety.

FIELD

This relates generally to electronic devices, and, more particularly, to display cover layers for electronic devices.

BACKGROUND

Electronic devices may have displays. Displays have arrays of pixels for displaying images for a user. To prevent damage to the pixels, the pixels can be covered with a transparent display cover layer. If care is not taken, however, the inclusion of a display cover layer into an electronic device may cause the device to have larger inactive border regions than desired or may introduce undesired image distortion.

SUMMARY

An electronic device may have a housing. A display may be mounted in the housing. A protective display cover layer may be formed over the display. During operation, images on the display may be viewed through the protective display cover layer.

The protective display cover layer may have an image transport layer such as a fiber optic plate. The fiber optic plate may guide and expand image light from the display and thereby expand the effective size of images on the display. The expanded image size helps cover peripheral housing structures and minimizes the size of display borders.

The fiber optic plate may be formed from fibers. Each fiber may have a high refractive-index core that is surrounded by a low refractive-index cladding. Binder material may hold together the fibers of the fiber optic plate.

To form the fiber optic plate, an extruder may form fiber bundles that each include a respective plurality of fibers distributed in binder material. The fiber bundles from the extruder may then be fed directly to a block forming die. The fiber bundles may remain heated in the block forming die such that the binder material of the fiber bundles seamlessly merges when the fiber bundles are brought in contact with each other. Ultimately, a unitary fiber block may be output from the block forming die. After the unitary fiber block has cooled, a cutter can be used to cut off a layer of the unitary fiber block. This layer may be machined and polished to form the fiber optic plate.

DETAILED DESCRIPTION

An electronic device may have a display. The display may have an array of pixels for creating an image. The image may pass through a protective display cover layer that overlaps the array of pixels. To minimize display borders, the display cover layer may include an image transport layer formed from a coherent fiber bundle or Anderson localization material. The image transport layer helps expand the effective size of the image without imparting undesired distortion to the image. In an illustrative configuration, which may sometimes be described herein as an example, a display cover layer for the display in an electronic device is formed from a fiber optic plate that contains a coherent fiber bundle.

Figure 1:
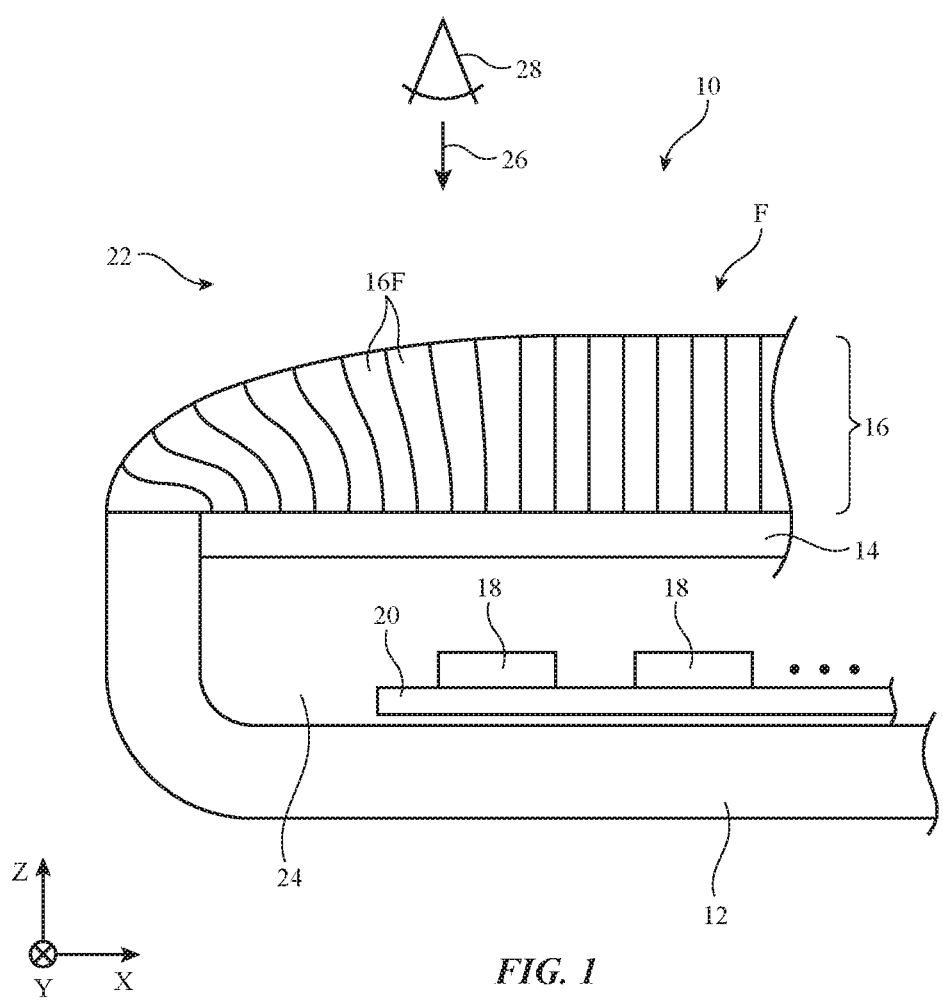
FIG. 1 is a side view of an illustrative electronic device with a fiber optic plate in accordance with an embodiment.

A cross-sectional side view of a portion of an illustrative electronic device with a display cover layer that includes a fiber optic plate is shown in FIG. 1. In the example of FIG. 1, device 10 is a portable device such as a cellular telephone, wristwatch, or tablet computer. Other types of devices may have display cover layers with fiber optic plates, if desired.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may be sufficiently flexible to be bent. Displays for device 10 may have pixel arrays for displaying images for a user. Each pixel array (which may sometimes be referred to as a display panel, display substrate, or display) may be mounted under a transparent display cover layer that helps to protect the pixel array. In the example of FIG. 1, pixel array (display) 14 is mounted under an image transport layer such as fiber optic plate 16, which serves as a protective display cover layer (and which may sometimes be referred to as forming a transparent portion of the housing for device 10). Additional protective layers (e.g., transparent layers of glass, crystalline material such as sapphire, etc.) may be stacked above and/or below fiber optic plate 16. The configuration of FIG. 1 in which the display cover layer for device 10 is formed from fiber optic plate 16 is illustrative.

During operation, the pixels of display 14 produce image light that passes through optical fibers 16F in fiber optic plate 16 for viewing by a user such as viewer 28 who is viewing device 10 in direction 26. The fibers or other optical structures of image transport layer structures such as fiber optic plate 16 (which may sometimes be referred to as a coherent fiber bundle, image transport layer, etc.) transport light (e.g., image light and/or other light) from one surface (e.g., the surface of plate 16 facing display 14) to another (e.g., the surface of plate 16 facing viewer 28) while preserving the integrity of the image light or other light. This allows an image produced by an array of pixels in a flat or curved display to be transferred from an input surface of a first shape at a first location to an output surface with a curved cross-sectional profile, compound curvature, or other desired second shape at a second location. The fiber optic plate may therefore move the location of an image and may optionally change the shape of the surface on which the image is presented.

Device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the rectangular periphery of plate 16 may be deformed outwardly as shown in FIG. 1. The deformed shapes of fibers 16F help distribute image light laterally outwards in the X-Y plane so that the effective size of display 14 is enlarged and the image produced by display 14 covers some or all of the sidewalls of housing 12 when the image on front face F is being viewed by viewer 28. For example, the bent shapes of fibers 16F may help shift portions of the displayed image laterally outward in the X-Y plane along the edges and corners of device 10 to block the sidewall portions of housing 12 from view. In some arrangements, the portions of fibers 16F at the outermost surface of layer 16 are oriented parallel or nearly parallel with viewing direction 26 and the Z axis of FIG. 1, which helps ensure that some or all of the light that has passed through plate 16 will travel in the Z direction and be viewable by viewer 28.

Figure 2:
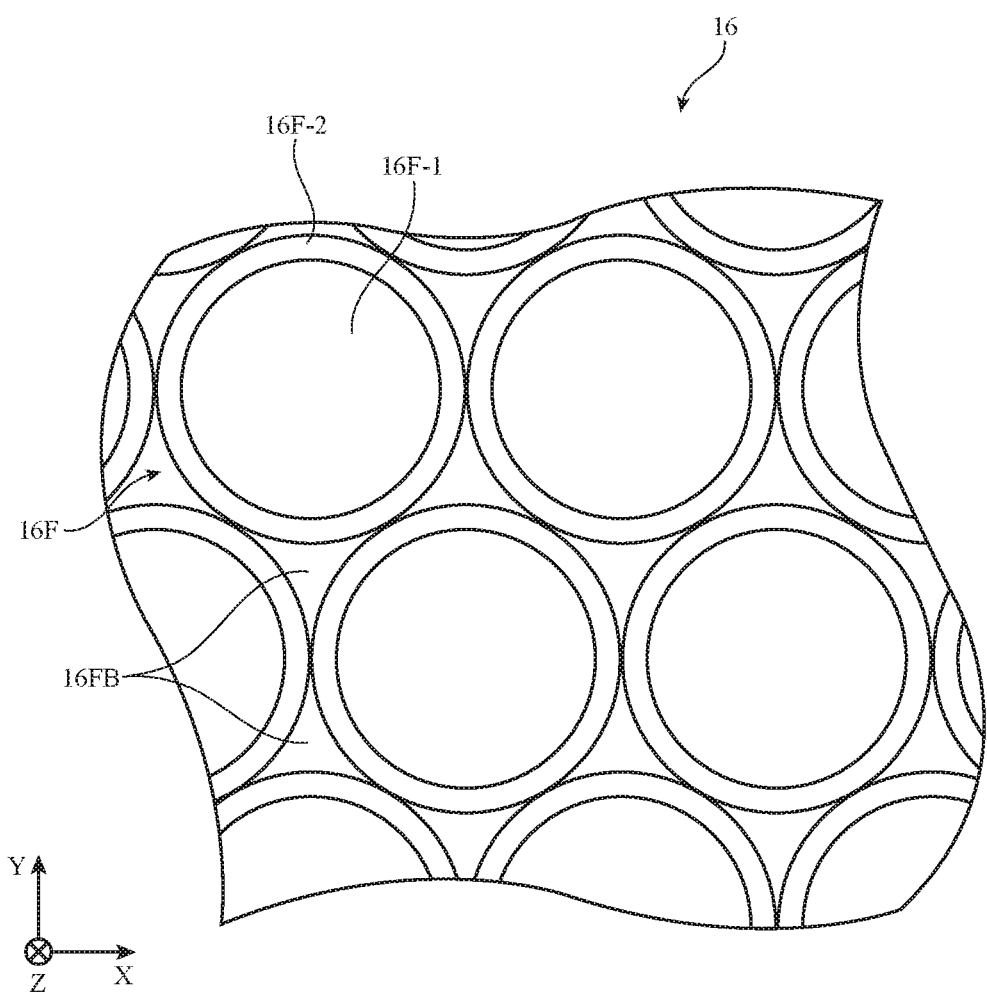
FIG. 2 is a cross-sectional view of a portion of a fiber optic plate in accordance with an embodiment.

Fibers 16F for fiber optic plate 16 may have any suitable configuration. A cross-sectional view of fiber optic plate 16 in an illustrative arrangement in which fibers 16F have multiple layers of material is shown in FIG. 2. As shown in FIG. 2, fibers 16F may each have a core such as core 16F-1. Cores 16F-1 and the other structures of fiber optic plate 16 may be formed from transparent materials such as polymer, glass, crystalline material such as sapphire, and/or other transparent materials. In an illustrative configuration, which may sometimes be described herein as an example, fiber optical plate 16 includes polymer fibers.

Fiber cores 16F-1 may be formed from polymer of a first refractive index and may be surrounded by cladding 16F-2 (e.g., polymer) of a second, lower refractive index. The difference in refractive index between cores 16F-1 and cladding 16F-2 may be greater than 0.1, greater than 0.2, greater than 0.3, between 0.2 and 0.4, etc. This arrangement allows fibers 16F to guide light in accordance with the principal of total internal reflection. Binder material 16FB (e.g., clear polymer) may hold fibers 16F together to form plate 16. The fractional cross-sectional area occupied by core 16F-1 may be between 65% and 85%, between 60% and 75%, greater than 60%, greater than 65%, greater than 70%, or another desired value. The fractional cross-sectional area occupied by cladding 16F-2 may be between 2% and 10%, between 1% and 20%, greater than 5%, less than 20%, less than 15%, less than 10%, or another desired value. The fractional cross-sectional area occupied by binder material 16FB may be between 2% and 10%, between 1% and 20%, greater than 5%, less than 20%, less than 15%, less than 10%, or another desired value.

In some configurations, a stray light absorbing layer may be applied as a coating on cladding 16F-2 to help absorb stray light. The stray light absorbing layer may contain black pigment, black dye, or other light absorbing material that absorbs and blocks light. The stray light absorbing material may be incorporated into image transport layer 16 in other ways if desired. For example, stray light absorbing material may be incorporated as an additive into cladding 16F-2, may be incorporated as an additive into binder 16FB, etc.

The diameter of core 16F-1 may be 5-15 microns or other suitable size (e.g., at least 3 microns, at least 7 microns, 10 microns, at least 15 microns, less than 20 microns, less than 14 microns, etc.). The thickness of cladding 16F-2 may be 0.5 microns, at least 0.1 microns, at least 0.4 microns, less than 2 microns, less than 0.9 microns, or other suitable thickness. If desired, fibers 16F may contain more layers, fewer layers, layers arranged in different orders, and/or may have other configurations.

There are many ways to produce fiber optic plates of the type shown in FIGS. 1 and 2. In one illustrative example, an extruder may be used to produce spools of fibers. The extruder may be used to produce single-strand fibers and/or bundles that contain hundreds of fibers. In one example, the spools of fibers produced by the extruder solidify after being produced by the extruder. The solid fibers then undergo additional processing in order to produce a fiber optic plate. There may be multiple winding and fusion steps performed until a fiber optic plate having the desired dimensions is obtained. Performing multiple winding and fusion steps in this fashion may result in low throughput, high wastage, and increased chances of contamination due to repeated handling. Additionally, prolonged exposure of the fibers to high temperatures may cause degradation of the fibers' physical properties and there may be increased chance of fiber misalignment due to the absence of longitudinal tension during the fusion steps.

To mitigate some of these issues that may occur during multi-stage formation of a fiber optic plate, the fiber optic plate may instead be formed in a single-stage process. Fiber bundles from an extruder may be coupled directly to a block forming die that fuses the fiber bundles together into a fused block of fibers that can be cut into a fiber optic plate of desired dimensions.

Figure 3:
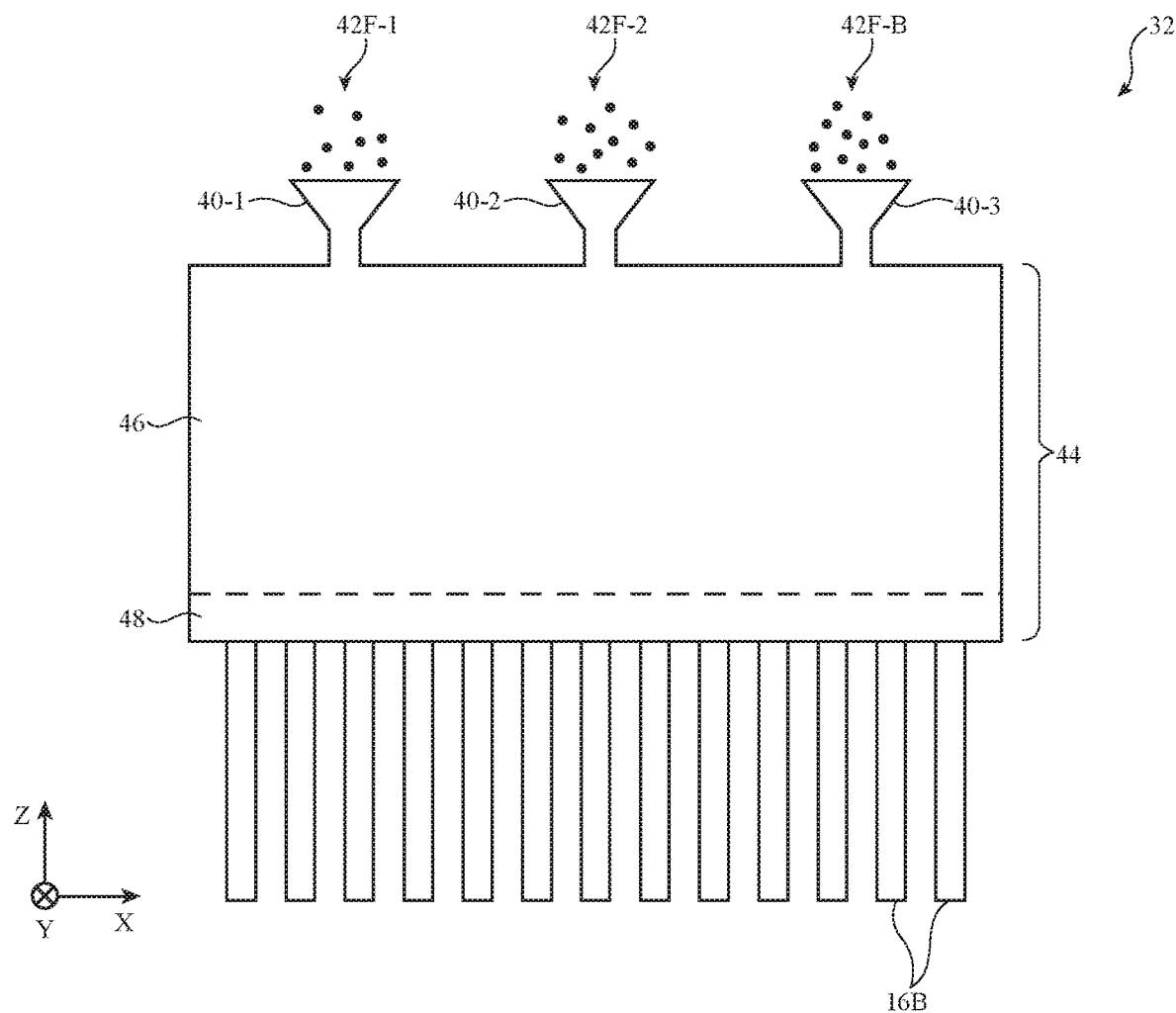
FIG. 3 is a side view of an illustrative extruder for producing fiber bundles in accordance with an embodiment.

FIG. 3 is a diagram of an illustrative extruder that may be used during manufacture of a fiber bundle. As shown in FIG. 3, extruder 32 may have hoppers 40 that contain raw material (e.g., polymers) for the different portions of plate 16. A first hopper 40-1 may contain raw material 42F-1 (e.g., a clear polymer) of a first refractive index for forming fiber cores 16F-1. A second hopper 40-2 may contain raw material 42F-2 (e.g., a clear polymer) of a second refractive index that is lower than the first refractive index. Raw material 42F-2 may be used to form fiber cladding 16F-2. A third hopper 40-3 may contain raw material 42F-B that is used to form binder 16FB. Raw materials 42F-1, 42F-2, and 42F-B may be different types of polymers. In arrangements where stray light absorbing material is incorporated into the cladding or binder of fibers 16F, a black pigment or dye may be added to hopper 40-2 or hopper 40-3. A separate hopper may be included that receives stray light absorbing raw material (e.g., a black light-absorbing polymer) in examples where a separate coating of stray light absorbing material is applied to each fiber.

The different polymers in hoppers 40 may be heated to soften and/or liquefy these polymers so that these different polymers may be extruded through extruder die 44 to form fibers such as fiber bundles 16B. Extruder die 44 may include numerous melt distribution plates 46 and a spinneret 48. Melt distribution plates 46 (sometimes referred to as distribution plates 46, die plates 46, etc.) may guide the polymer material through the die to form fibers having desired shapes and dimensions. Spinneret 48 (sometimes referred to as die outlet plate 48) may form an outlet for die 44. The spinneret may have a number of openings. A corresponding fiber or fiber bundle may be output from each opening. There may be any desired number of openings in the spinneret (e.g., more than 100 openings, more than 1,000 openings, more than 5,000 openings, more than 10,000 openings, more than 20,000 openings, between 10,000 and 50,000 openings, between 10,000 and 30,000 openings, more than 100,000 openings, more than 150,000 openings, less than 300,000 openings, between 100,000 and 200,000 openings, between 150,000 and 200,000 openings, etc.).

In some cases, one individual fiber 16F may be output from each opening in spinneret 48. Alternatively, as shown in FIG. 3, each opening in spinneret 48 may output a respective fiber bundle 16B. Each fiber bundle 16B may have a plurality of fibers 16F distributed in binder material 16FB. A process of this type in which fiber bundles each containing a plurality of fibers are extruded from die 44 may be referred to as islands-in-the-sea (IITS) extrusion. Extrusion die 44 may sometimes therefore be referred to as islands-in-the-sea extrusion die 44.

Figure 4:
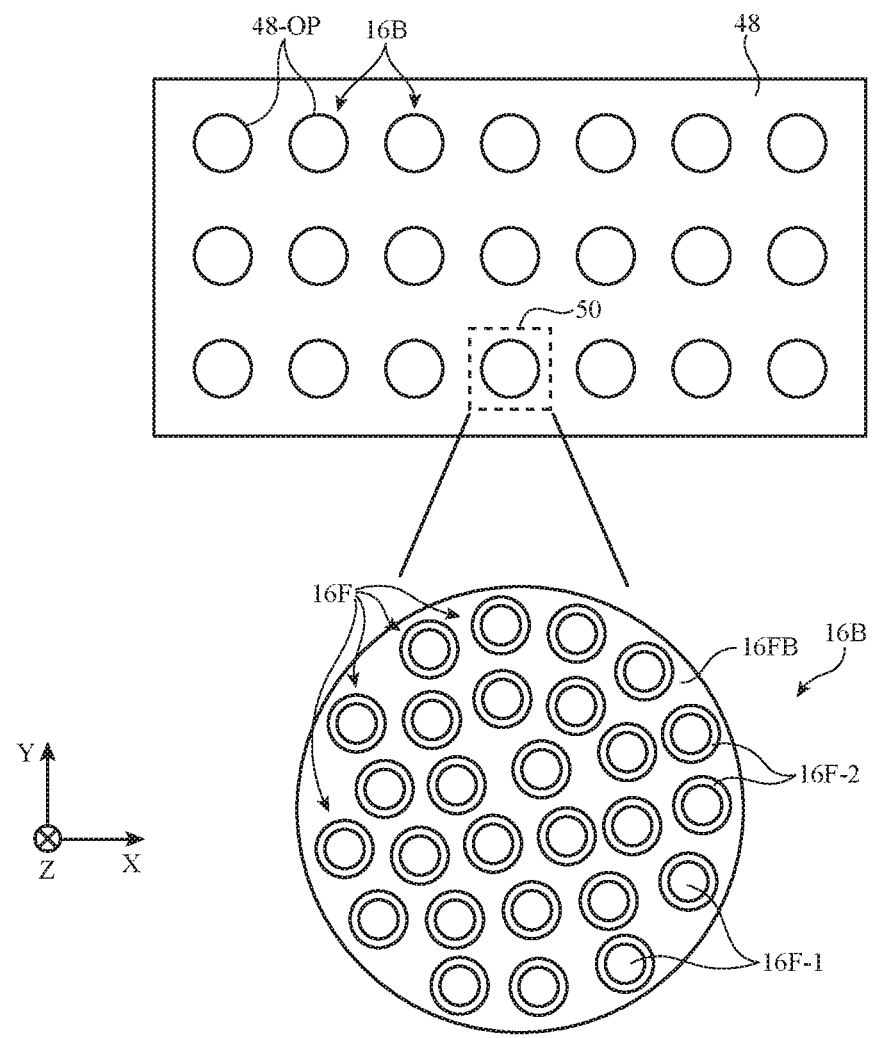
FIG. 4 is a cross-sectional view of fiber bundles that are extruded by the extruder of FIG. 3 in accordance with an embodiment.

FIG. 4 is a cross-sectional view of fiber bundles that are output from spinneret 48 of islands-in-the-sea extrusion die 44 (e.g., looking up at the fiber bundles emerging form the spinneret in a direction parallel to the Z-axis in FIG. 3). As shown in FIG. 4, bundles 16B may be output from openings 48-OP in spinneret 48. The relatively small number of openings 48-OP (and corresponding fiber bundles 16B) depicted in FIG. 4 is merely illustrative. As previously mentioned, spinneret 48 may include hundreds, thousands, tens of thousands, or hundreds of thousands of openings, each with a corresponding fiber bundle output.

Inset portion 50 of FIG. 4 shows a detailed view of a respective islands-in-the-sea fiber bundle 16B. As shown in FIG. 4, each fiber bundle 16B includes a plurality of fibers 16F that are held together by binder 16FB. Each fiber 16F may include a high refractive-index core 16F-1 that is surrounded by a low refractive-index cladding 16F-2. Each fiber bundle 16B may include any desired number of fibers 16F. For example, each fiber bundle 16B may include more than 100 fibers, more than 500 fibers, more than 1,000 fibers, more than 2,000 fibers, more than 4,000 fibers, more than 10,000 fibers, less than 8,000 fibers, less than 6,000 fibers, between 500 and 1,000 fibers, between 750 and 1,000 fibers, between 5,000 and 8,000 fibers, between 5,000 and 6,000 fibers, or any other desired number of fibers. The number of fibers included in each fiber bundle may depend on the diameter of each fiber 16F. In one illustrative example, the diameter of fiber 16F may be approximately (e.g., within 10% of) 10 microns. In this scenario, each fiber bundle may include approximately (e.g., within 10% of) 900 fibers. In another example, the diameter of fiber 16F may be approximately (e.g., within 10% of) 4 microns. In this scenario, each fiber bundle may include approximately (e.g., within 10% of) 5,600 fibers. These examples are merely illustrative and in general each fiber bundle may include any desired number of fibers each having any desired diameter.

Figure 5:
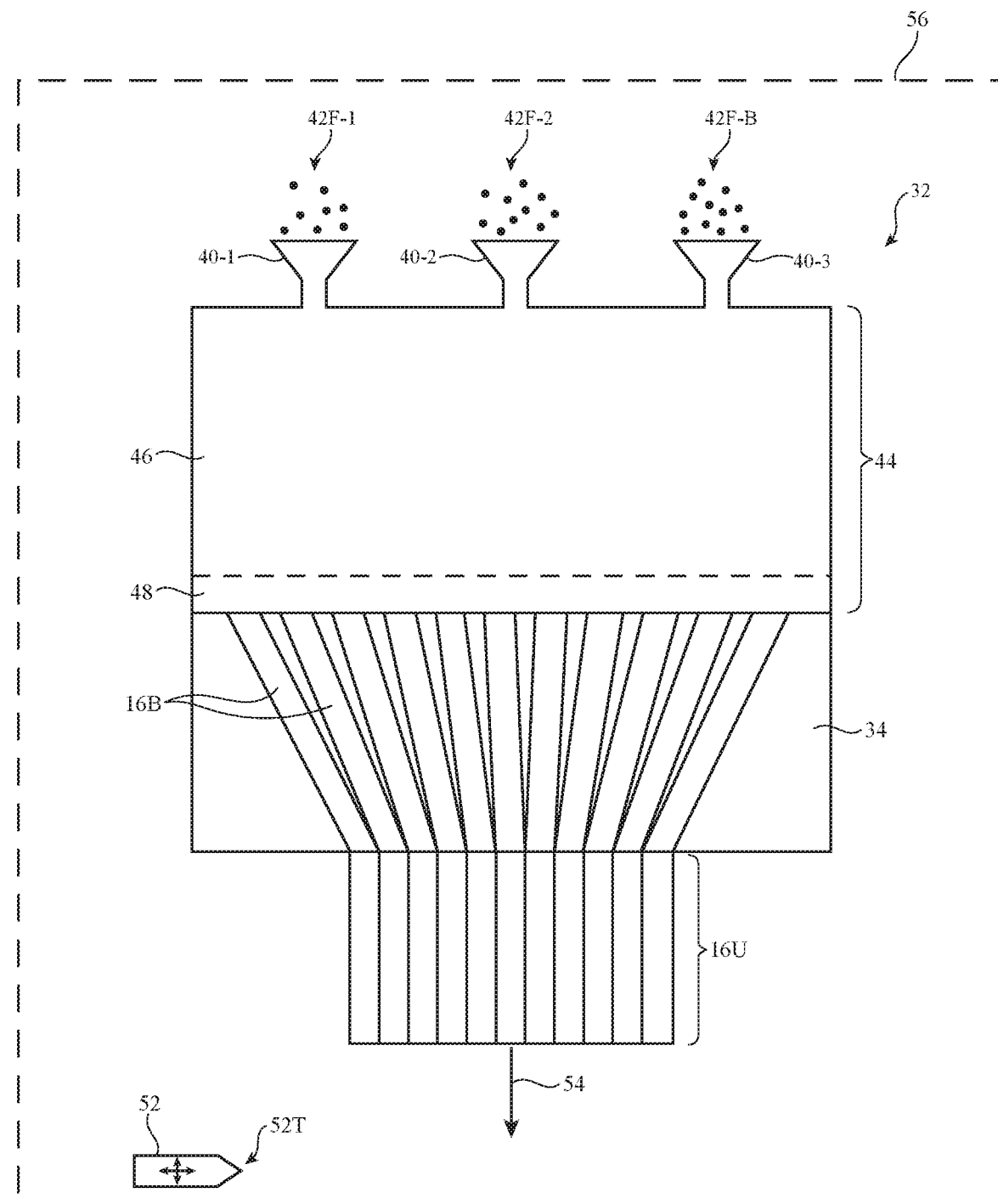
FIG. 5 is a side view of illustrative fiber forming equipment including a block forming die that receives fiber bundles directly from an extruder and outputs a unitary fiber block in accordance with an embodiment.

FIG. 5 is a diagram showing how an extruder may feed fiber bundles (each having multiple fibers) directly into a block forming die. In FIG. 5, an extruder 32 is included similar to as shown in connection with FIG. 3. As discussed in connection with FIG. 3, extruder 32 has hoppers 40 that receive raw material (e.g., polymer pellets) and an extruder die 44 that outputs fiber bundles 16B from spinneret 48. In this case, the output from die 44 is provided directly to block forming die 34.

Block forming die 34 may receive fiber bundles 16B as input and may output a continuous block of fibers. Block forming die 34 may have a single opening or a plurality of openings at an input face of the block forming die. Each of the openings may receive a single respective fiber bundle from spinneret 48 or may receive multiple fiber bundles from spinneret 48. In some cases, the input face of block forming die 34 may be in direct contact with the output face of extruder die 44. Alternatively, there may be an air gap between the output face of the extruder die and the input face of the block forming die.

Block forming die 34 may have guide plates with openings (channels) to guide the fiber bundles 16B into a unitary block. While in block forming die 34, the fiber bundles may still be heated such that the fiber bundles are softened and/or liquefied (molten). Therefore, as the fiber bundles converge and ultimately touch, the binder material of each fiber bundle combines and forms a single unitary binder material. Consequently, a unitary coherent fiber bundle 16U is output from block forming die 34.

Because the fiber bundles are combined while still heated in die 34, the produced fiber block 16U (sometimes referred to as fiber bundle 16U, coherent fiber bundle 16U, fiber block 16U, etc.) will have a seamless connection between each of the fiber bundles. Due to this seamless connection, the footprint of the fiber bundles may not be detectable in the unitary fiber block 16U. Fiber block 16U may simply include a plurality of fibers 16F distributed in binder material 16FB.

Upon exiting block forming die 34, the unitary fiber block 16U may be cooled so that the fibers solidify. During the extrusion and block forming process performed by the equipment of FIG. 5, the raw material may only be heated and solidified once. This process may therefore sometimes be referred to as a single-stage process or single-step process. In contrast, a multi-step fiber block forming process may include solidifying and liquefying the fiber material multiple times during repeated extrusion, winding, and fusion steps. The single-step process depicted in FIG. 5 has the advantages of increased throughput, reduced wastage, reduced degradation of the polymer material during processing, reduced chances of contamination due to reduced handling, mitigated fiber misalignment, etc.

If desired, one or more of the pieces of equipment depicted in FIG. 5 may be formed in a chamber such as chamber 56. Gases (e.g., nitrogen, oxygen, etc.) may be selectively introduced into the interior of chamber 56 from one or more computer-controlled gas sources. The walls of the chamber and other desired portions of chamber 56 may be heated (e.g., using computer-controlled heaters). For example, chamber 56 may be heated to a temperature greater than 150° C., greater than 200° C., greater than 250° C., greater than 300° C., between 200° C. and 400° C., between 100° C. and 400° C., between 250° C. and 350° C., less than 350° C., or another desired temperature. The chamber may be at a relatively uniform temperature or there may be a temperature gradient in the chamber. In one example, the temperature may decrease as the fibers move through the process. The temperature may be highest in extruder die 44 and may be lower in block forming die 34 than in the extruder. The fibers may cool upon exiting block forming die 34. To ensure that the interior temperature of chamber 56 is maintained at a desired level, chamber 56 may optionally be provided with a computer-controlled chamber gate (e.g., one or more sliding doors or other structures for sealing a chamber wall opening). Chamber 56 may optionally be omitted. Regardless of the presence of chamber 56, extruder die 44 and block forming die 34 may be heated to allow flow of polymer material (e.g., liquefied polymer material) through the dies. Each component of FIG. 5 may optionally be positioned inside or outside chamber 56.

In one possible arrangement, unitary fiber block 16U may be cooled upon exiting block forming die 34. The unitary fiber block may be cooled using blown air, water, or another desired material. Cooling the unitary fiber block may cause the unitary fiber block to solidify. The unitary fiber block may also be cooled by ambient air or gas. After being cooled, the unitary fiber block may be reheated to prevent a high temperature difference between the center of the unitary fiber block and the surfaces of the unitary fiber block.

Once unitary fiber block 16U has solidified, a cutting tool such as cutter 52 may be used to cut a fiber optic plate from the fiber block. Cutter 52 may have one or more parts with one or more sharp edges 52T for cutting through fiber bundle 16U. The position of cutter 52 may be adjusted using a computer-controlled positioner. After the fiber bundle has been formed by die 34 and has sufficiently cooled, cutter 52 may be moved laterally through the fiber bundle to cut off a layer of the fiber bundle that contains the deformed fibers. This cut off layer forms a rough plate of fibers (e.g., a blank) that can later be machined, polished, and/or otherwise processed into a finished fiber optic plate 16.

In order to cut a fiber optic plate 16 from fiber block 16U, cutter 52 may move laterally along the X-axis towards the fiber block. However, fiber block 16U may be moving in direction 54 (e.g., parallel to the Z-axis in the negative Z-direction). The extrusion and fiber block forming process depicted in FIG. 5 may be continuous. Therefore, a continuous stream of fibers emerges from block forming die 34 in direction 54. The fibers may move at any desired rate (e.g., approximately 200 meters per minute, more than 100 meters per minute, more than 20 meters per minute, less than 300 meters per minute, between 150 and 250 meters per minute, more than 1 meter per minute, etc.). If cutter 52 was only moved along the X-axis while fiber bundle 16U moved in direction 54, cutter 52 may break upon contacting fiber bundle 16U. Cutter 52 may therefore also move in direction 54 at the same speed that the fibers are moving. This way, cutter 52 can cut a fiber optic plate from fiber bundle 16U without needing to stop the continuous extrusion process and without breaking cutter 52.

Figure 6:
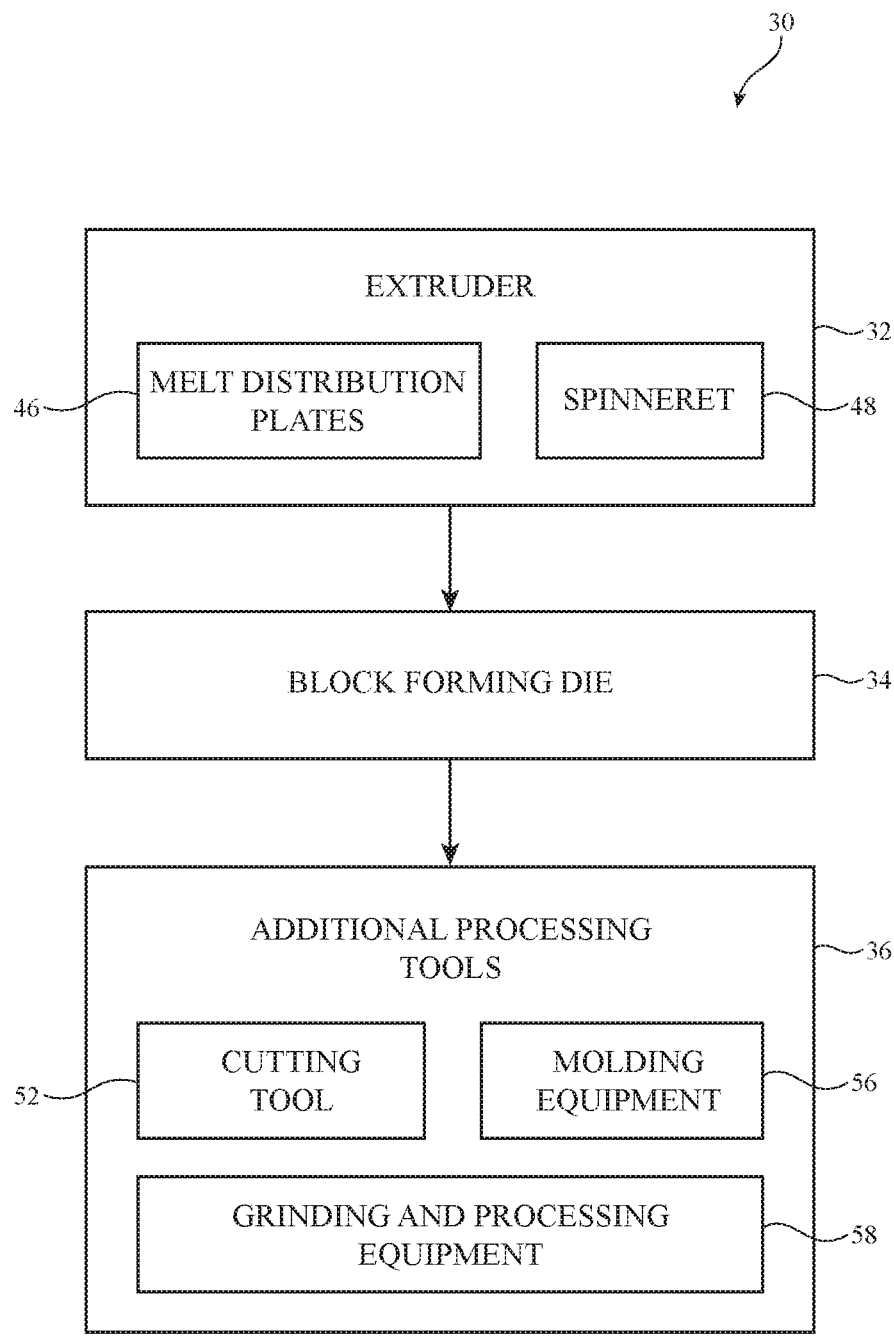
FIG. 6 is a diagram of illustrative equipment that may be involved in forming a fiber optic plate in accordance with an embodiment.

FIG. 6 is a diagram showing illustrative equipment that may be used to form a fiber optic plate. As shown in FIG. 6, equipment 30 (sometimes referred to as fiber forming equipment or unitary fiber block forming equipment) includes an extruder 32, block forming die 34, and additional processing tools 36. As previously shown and discussed in connection with FIGS. 3 and 5, extruder 32 may have hoppers for receiving raw materials for the fiber optic plate. The raw materials may be heated (e.g., past the melting points of the raw material) by the extruder. The raw materials are then guided by melt distribution plates 46 through the extruder die. Ultimately, fiber bundles are output from spinneret 48 of extruder 32. Each fiber bundle may include a plurality of fibers held together by binder material, with each fiber having a high refractive-index core and a low refractive-index cladding.

The fiber bundles may be output from spinneret 48 of extruder 32 directly to block forming die 34. In one example, block forming die 34 may have input openings of the same number and shape as the output openings of spinneret 48. Block forming die 34 may be heated such that the fiber bundles remain liquefied or softened. The block forming die may guide the fiber bundles together until the fiber bundles converge into a unitary fiber block. Because the fiber bundles are heated in block forming die 34, the binder material of the fiber bundles may merge when the fiber bundles are brought into contact by the block forming die. Ultimately, a unitary fiber block having a plurality of fibers (each with a core and cladding) is output from the block forming die.

Additional processing tools 36 may be used to manipulate the unitary fiber block output by block forming die 34. After exiting block forming die 34, the unitary fiber block may be cooled and then cut into a fiber optic plate 16 by a cutting tool such as cutting tool 52. In some examples, the unitary fiber block may be molded before or after being cut by the cutting tool. A molding die may be used to mold the unitary fiber block (or a blank cut by the cutting tool) while the fiber block is heated to a temperature sufficient to soften the fibers of the fiber block (e.g., greater than 150° C., greater than 200° C., greater than 250° C., greater than 300° C., between 200° C. and 400° C., between 100° C. and 400° C., between 250° C. and 350° C., less than 350° C., or another desired temperature). The molding die may mold the fiber block such that the fibers have desired shapes and follow desired light guiding paths (e.g., paths that laterally translate light as shown in FIG. 1). A computer-controlled positioner may position one or more die sections to mold the unitary fiber block (or a blank cut by the cutting tool) into a desired shape.

Following formation of the fiber optic plate structures by block forming die 34, cutting tool 52, and/or molding equipment 56, grinding and polishing equipment 58 may be used to form finished fiber optic plates 16. Grinding and polishing equipment 58 may include equipment to create desired surface shapes for the surfaces of each fiber optic plate 16. For example, machining equipment such as a grinding tool may be used to form curved edge profiles in the plate (such as the curved edge profile of FIG. 1). Polishing equipment may be used for polishing the surfaces of each fiber optic plate 16 into optically smooth surfaces for use in device 10. After the finished fiber optic plates are produced in this way, a fiber optic plate and additional structures (e.g., display layers, optional additional cover layers such as protective outer layers of glass or other materials, etc.) may be assembled with housings 12 and components 18 to form devices 10.

Figure 7:
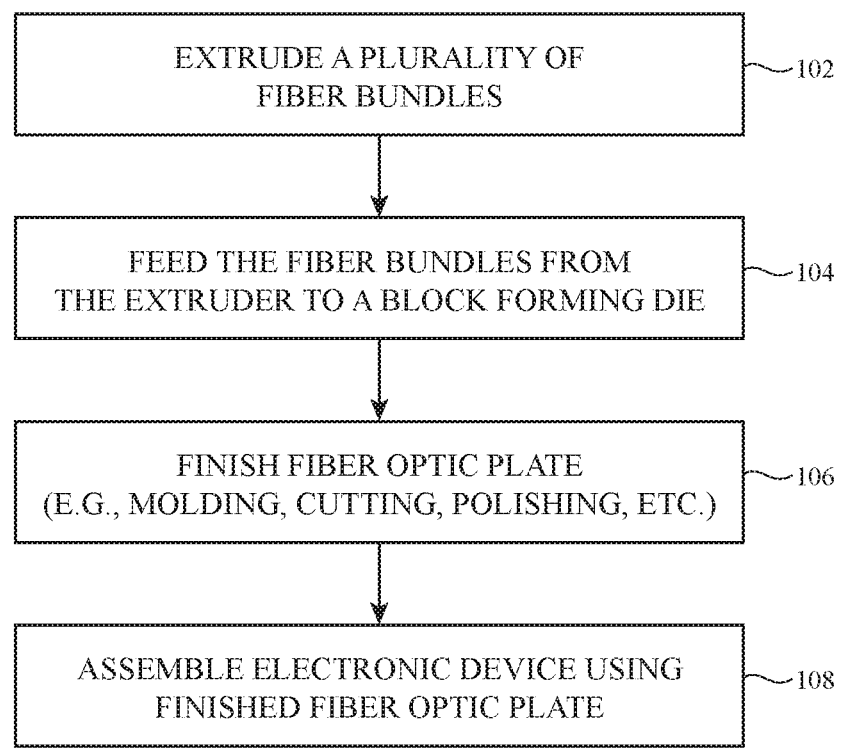
FIG. 7 is a flow chart of illustrative operations involved in forming a fiber optic plate in accordance with an embodiment.

FIG. 7 is a flow chart of illustrative operations involved in forming a fiber optic plate. During the operations of step 102, a plurality of fiber bundles may be extruded (e.g., using extruder 32). Each extruded fiber bundle may include a plurality of fibers with cores and clads distributed in binder material (e.g., in an islands-in-the-sea arrangement). This example is merely illustrative, and if desired each fiber may include light absorbing material (e.g., in the cladding, in the binder, as a separate annular fiber layer, etc.) or may include more than one cladding layer. In general, the fibers or fiber bundles produced by extruder 32 may have any desired structure and may be formed from any desired materials. During the operations of step 104, the fiber bundles from the extruder may be fed to a block forming die such as block forming die 34 in FIG. 5. The block forming die may guide the fiber bundles together to form a unitary fiber block.

During the operations of step 106, a fiber optic plate may be formed from the unitary fiber block produced by the block forming die. A fiber optic plate may be cut from the unitary fiber block. Additional molding operations may optionally be performed to shape the fiber optic plate before or after cutting. Once the fiber optic plate is cut from the unitary fiber block, polishing equipment may be used to polish the surfaces of the fiber optic plate.

During the operations of step 108, the finished fiber optic plate may be incorporated into an electronic device such as electronic device 10 in FIG. 1. The fiber optic plate may optionally be coupled to a display layer, a housing layer, and/or an optional additional cover layer formed over the fiber optic plate. In the assembled electronic device, the finished fiber optic plate may serve as an image transport layer that transports an image from an input surface (adjacent to a display layer) to an output surface. The output surface may optionally be covered by additional cover layers such as protective outer layers of glass or other material.

Figure 8:
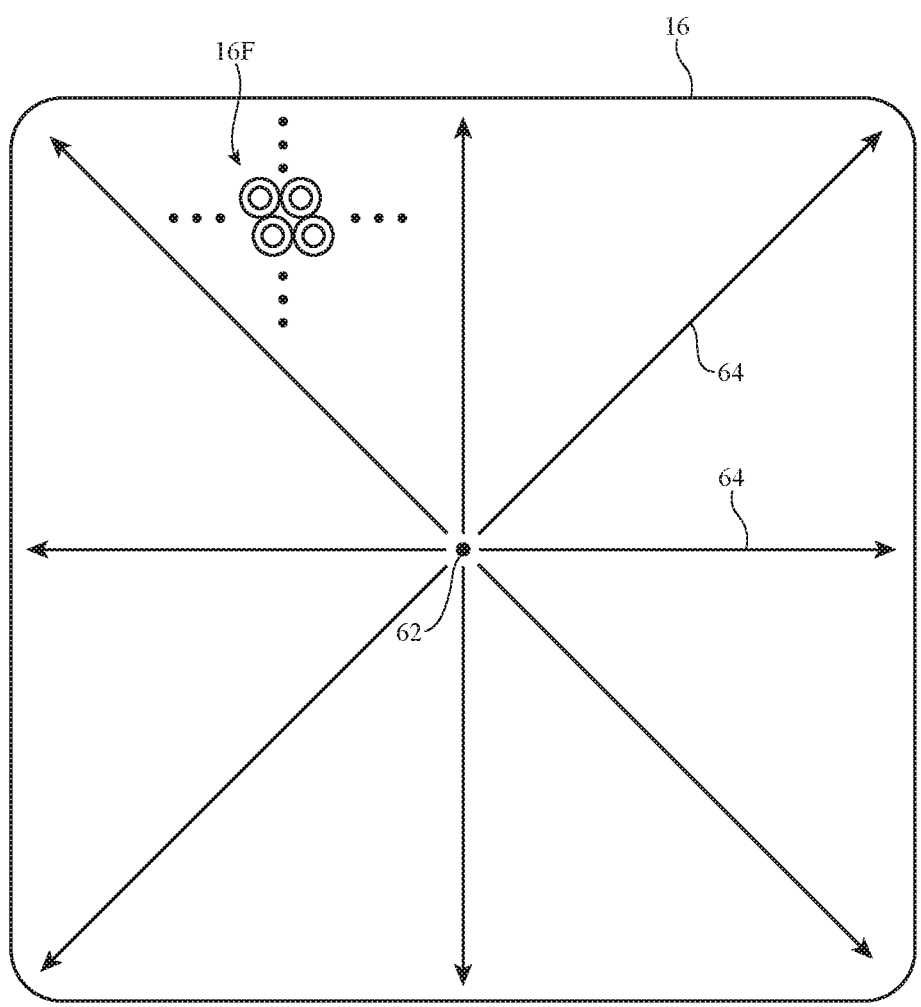
FIG. 8 is a top view of an illustrative fiber optic plate showing how fiber deformation may increase from the center of the fiber optic plate towards the edges of the fiber optic plate in accordance with an embodiment.

FIG. 8 is a top view of a finished fiber optic plate formed using the method of FIG. 7. In the example of FIG. 8, the fiber optic plate 16 has a square footprint with rounded corners. This example is merely illustrative, and the fiber optic plate may have any desired footprint (e.g., non-square rectangular). The fiber optic plate includes fibers 16F with cores and claddings that are held together with binder as previously discussed.

Fiber optic plate 16 has a center 62. Forming the fiber optic plate using the method of FIG. 7 (e.g., using the equipment of FIG. 5) may result in fibers at the edges of the fiber optic plate being deformed more than fibers at the center of the fiber optic plate. FIG. 5 shows how fiber bundles exiting the center of the spinneret have to undergo relatively little manipulation to reach their final location in unitary fiber block 16U. The fiber bundles at the edges, however, undergo more manipulation to be merged with the other fiber bundles and ultimately output in fiber block 16U.

FIG. 8 shows how fiber deformation may be at a minimum at the center 62 of the fiber optic plate. The fiber deformation may increase as the fibers move towards the edge of the fiber optic plate in accordance with arrows 64. The deformation (e.g., change in shape) of the fibers may continuously increase as the fiber position moves closer to the edge and further from the center. The deformation pattern may be symmetric about center 62 (e.g., through an axis that passes through center 62) and may increase radially from center 62. This is in contrast to a fiber optic plate formed using a multi-step draw and fusion process. In this type of method, fibers may be formed, solidified, then fused into larger bundles that are subsequently drawn, formed with additional bundles, etc. Fiber optic plates using this type of multi-step process will have multiple localized areas where fiber deformation varies. For example, as the fiber position varies from the center of the fiber optic plate to the edge of the fiber optic plate, the fiber deformation will vary between numerous local maximums and local minimums instead of continually increasing as in FIG. 8. The arrangement of FIG. 8 may allow for a more uniform fiber optic plate compared to a fiber optic plate formed from a multi-step process.

Deformation of the fibers (e.g., as shown in FIG. 8) may refer to deformation of the core, cladding, and/or binder of the fibers. For example, the cross-sectional shape of the fiber core (and corresponding cladding) may be circular at center 62 of fiber optic plate 16 in FIG. 8 (e.g., at the input surface of the image transport layer). The cross-sectional shape at the input surface may become more oval as the fibers move towards the edges of the plate. The cladding may have a uniform thickness at the center of the fiber optic plate. The amount of thickness variation in the cladding may increase as the fibers move towards the edges of the fiber optic plate. FIG. 1 shows how the fibers 16F may be bent (e.g., in order to hide inactive areas of the display and/or housing structures). These fiber bends may be categorized differently than the deformation of fibers caused by the single-step extrusion process of FIGS. 5-7. In other words, the unitary fiber block 16U produced by the single-step extrusion process of FIG. 5 may have the deformation profile shown in FIG. 8 even when all of the fibers are in an unbent state. Additional bending of the fibers may occur during step 106 of FIG. 7 while producing a finished fiber optic plate, but the underlying deformation profile caused by the single-step extrusion may remain regardless of the bends in the fibers.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
an array of pixels configured to display an image; and
an image transport layer having an input surface,
an output surface, a center, and edges, wherein the image transport layer is configured to transport the image from the input surface to the output surface, wherein the image transport layer includes a plurality of fibers, and wherein deformation of the plurality of fibers increases from the center of the image transport layer towards the edges of the image transport layer in a first direction, in a second direction that is orthogonal to the first direction, and in a third direction that is between the first and second directions.

2. The electronic device defined in claim 1, wherein the deformation of the plurality of fibers is at a minimum at the center of the image transport layer and wherein the deformation of the plurality of fibers increases radially from the center of the image transport layer towards the edges of the image transport layer.

3. The electronic device defined in claim 1, wherein the deformation of the plurality of fibers is symmetric about an axis that passes through the center of the image transport layer.

4. The electronic device defined in claim 1, wherein each one of the plurality of fibers includes a core and a cladding that surrounds the core and wherein a cross-sectional shape of the core at the input surface becomes more oval as a position of that fiber moves closer to the edges of the image transport layer.

5. The electronic device defined in claim 1, wherein the image transport layer has a footprint with rounded corners.

6. The electronic device defined in claim 1, wherein the deformation of the plurality of fibers comprises deformation of a cross-sectional shape of each fiber in the plurality of fibers.

7. The electronic device defined in claim 1, wherein each one of the plurality of fibers includes a core and a cladding that surrounds the core and wherein the deformation of the plurality of fibers comprises deformation of a cross-sectional shape of the core at the input surface for each fiber.

8. The electronic device defined in claim 1, wherein each one of the plurality of fibers includes a core and a cladding that surrounds the core and wherein an amount of thickness variation in the cladding of each fiber increases radially from the center of the image transport layer towards the edges of the image transport layer.

9. The electronic device defined in claim 1, wherein the plurality of fibers includes a first fiber at the center of the image transport layer, a second fiber at one of the edges of the image transport layer, and a third fiber that is interposed between the first and second fibers, wherein the first fiber has a first core with a circular cross-sectional shape, wherein the second fiber has a second core with a first oval cross-sectional shape, and wherein the third fiber has a third core with a second oval cross-sectional shape that is less oval than the first oval cross-sectional shape.

10. An electronic device comprising:
an array of pixels configured to display an image; and
an image transport layer having an input surface, an output surface, a center, and edges, wherein the image transport layer is configured to transport the image from the input surface to the output surface, wherein the image transport layer includes a plurality of fibers, wherein the plurality of fibers includes a first fiber at the center of the image transport layer, a second fiber at one of the edges of the image transport layer, and a third fiber that is interposed between the first and second fibers, wherein the first fiber has a first cladding with a first amount of thickness variation, wherein the second fiber has a second cladding with a second amount of thickness variation, and wherein the third fiber has a third cladding with a third amount of thickness variation that is between the first and second amounts.

11. An electronic device comprising:
an array of pixels configured to display an image; and
an image transport layer having an input surface, an output surface, a center, and edges, wherein the image transport layer is configured to transport the image from the input surface to the output surface, wherein the image transport layer includes a plurality of fibers, and wherein cross-sectional deformation of the plurality of fibers increases continuously and radially from the center of the image transport layer towards the edges of the image transport layer.

12. An electronic device comprising:
an image transport layer having an input surface, an output surface, a center, and edges, wherein the image transport layer is configured to transport light from the input surface to the output surface, wherein the image transport layer includes a plurality of fibers, and wherein cross-sectional deformation of the plurality of fibers increases continuously from the center of the image transport layer towards the edges of the image transport layer.

13. The electronic device defined in claim 12, wherein the cross-sectional deformation of the plurality of fibers is symmetric about an axis that passes through the center of the image transport layer.

14. The electronic device defined in claim 12, wherein the image transport layer has a footprint with rounded corners.

15. The electronic device defined in claim 12, wherein the cross-sectional deformation of the plurality of fibers increases from the center of the image transport layer towards the edges of the image transport layer in a first direction, in a second direction that is orthogonal to the first direction, and in a third direction that is between the first and second directions.

* * * * *